United States Patent
Baby et al.

(10) Patent No.: US 8,346,725 B2
(45) Date of Patent: Jan. 1, 2013

(54) EVOLUTION OF XML SCHEMAS INVOLVING PARTIAL DATA COPY

(75) Inventors: Thomas Baby, Foster City, CA (US); Abhyudaya Agrawal, San Francisco, CA (US); Sam Idicula, San Jose, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 436 days.

(21) Appl. No.: 11/521,907

(22) Filed: Sep. 15, 2006

(65) Prior Publication Data

US 2008/0071812 A1   Mar. 20, 2008

(51) Int. Cl.
*G06F 7/00* (2006.01)

(52) U.S. Cl. .................. 707/638; 707/695; 707/806

(58) Field of Classification Search .................. None
See application file for complete search history.

(56) References Cited

U.S. PATENT DOCUMENTS

| | | | |
|---|---|---|---|
| 6,016,497 A | 1/2000 | Suver | |
| 6,216,136 B1 * | 4/2001 | Ronstrom | 1/1 |
| 6,243,709 B1 | 6/2001 | Tung | |
| 6,385,618 B1 * | 5/2002 | Ng et al. | 1/1 |
| 6,473,765 B1 * | 10/2002 | Fink | 707/702 |
| 6,523,036 B1 | 2/2003 | Hickman et al. | |
| 6,587,856 B1 | 7/2003 | Srinivasan et al. | |
| 6,763,359 B2 | 7/2004 | Lohman et al. | |
| 6,785,690 B1 | 8/2004 | Davidson | |
| 6,847,978 B2 | 1/2005 | Ellis et al. | |
| 6,917,935 B2 | 7/2005 | Zwiegincew et al. | |
| 6,957,230 B2 | 10/2005 | Cameron et al. | |
| 6,961,734 B2 | 11/2005 | Kauffman | |
| 6,970,876 B2 | 11/2005 | Hotti et al. | |
| 7,016,902 B2 | 3/2006 | El-Shimi et al. | |
| 7,028,028 B1 | 4/2006 | Balmin et al. | |
| 7,031,956 B1 | 4/2006 | Lee et al. | |
| 7,146,399 B2 * | 12/2006 | Fox et al. | 709/203 |
| 7,370,270 B2 * | 5/2008 | Feng | 715/234 |
| 2002/0169788 A1 * | 11/2002 | Lee et al. | 707/104.1 |
| 2002/0174142 A1 * | 11/2002 | Demers et al. | 707/509 |
| 2003/0140308 A1 * | 7/2003 | Murthy et al. | 715/500 |
| 2004/0083218 A1 * | 4/2004 | Feng | 707/100 |
| 2004/0215656 A1 * | 10/2004 | Dill et al. | 707/103 R |
| 2004/0220912 A1 * | 11/2004 | Manikutty et al. | 707/3 |

(Continued)

OTHER PUBLICATIONS

Klettke "Conceptual XML Schema Evolution the CoDEX approach for Design and Redesign" University of Greifswald, Germany.*

(Continued)

*Primary Examiner* — Pierre Vital
*Assistant Examiner* — Berhanu Mitiku
(74) *Attorney, Agent, or Firm* — Hickman Palermo Truong Becker Bingham Wong LLP (57) ABSTRACT

XML schema evolutions can be performed on an XML-type database using partial data copy techniques. The partial data copy techniques provide mechanisms to identify a minimal set of data in the database that needs be copied out in order for schema evolution operations to occur. Identifying the minimal set of data involves comparing an existing XML schema to a new XML schema and determining the differences between the two schemas. Based on those differences, a minimal set of data can be determined. That data can then be copied to a temporary storage location, while the XML schema and its associated database structure are updated to conform to the new XML schema. Then, the minimal set of data is copied back into the modified database structure.

20 Claims, 7 Drawing Sheets

U.S. PATENT DOCUMENTS

| | | | |
|---|---|---|---|
| 2004/0268240 | A1 | 12/2004 | Vincent |
| 2005/0228800 | A1* | 10/2005 | Dettinger et al. ............. 707/100 |
| 2006/0259458 | A1* | 11/2006 | Hunter et al. ..................... 707/2 |
| 2007/0179962 | A1* | 8/2007 | Hernandez-Sherrington et al. ............................. 707/101 |
| 2007/0198659 | A1* | 8/2007 | Lam .............................. 709/219 |
| 2007/0203931 | A1* | 8/2007 | Ukelson et al. ............... 707/101 |

OTHER PUBLICATIONS

Chien et al. "Copy-Based versus Edit-Based Version Management Schemes for Structured Documents" Computer Science Department, UCLA. Department of Computer Science and Engineering, UC Riverside.*

Guerrini et al. "Impact of XML Schema Evolution on Valid Documents" WIDM'05, Nov. 5, 2005, Bremen, Germany. Copyright 2005 ACM.*

Guerrini et al. "XML Schema Evolution: Incremental Validation and Efficient Document Adaptation" DISI—Universit'a degli Studi di Genova, Italy.*

Madhavan et al. "Generic Schema Matching with Cupid" Microsoft Research, Microsoft Corporation Aug. 2001.*

Rahm et al. "On Matching Schemas Automatically" Microsoft Research, Microsoft Corporation Feb. 2001.*

Guerrini et al. "XML Schema Evolution" Universita di Genova, Italy.*

* cited by examiner

FIG. 1

```
<XML version="1.0" encoding="UTF-8">
    <xsd:schema version="1.0" xmlns:xsd="http://www.w3.org/2001/XMLSchema">
        <xsd:element name="Person">                          200
            <xsd:complexType>
                <xsd:sequence>
                    <xsd:element name="Name" type="xsd:string"/>
                    <xsd:element name="BirthDate" type="xsd:string"/>     210
                    <xsd:element name="Address" type="xsd:string"/>
                    <xsd:element name="PhoneNumber" type="xsd:string"/>
                </xsd:sequence>
            </xsd:complexType>
        </xsd:element>
    </xsd:schema>
```

```
<XML version="1.0" encoding="UTF-8">
    <xsd:schema version="1.0" xmlns:xsd="http://www.w3.org/2001/XMLSchema">
        <xsd:element name="Person">
            <xsd:complexType>
                <xsd:sequence>
                    <xsd:element name="Name" type="xsd:string"/>
                    <xsd:element name="BirthDate" type="xsd:DateType"/>   230
                    <xsd:element name="Address" type="xsd:string"/>
                    <xsd:element name="PhoneNumber" type="xsd:string"/>
                </xsd:sequence>
            </xsd:complexType>
            <xs:simpleType name="DateType">
                <xs:restriction base="xs:date">
                    <xs:minLength value="10"/>
                    <xs:maxLength value="12"/>
                </xs:restriction>
            </xs:simpleType>                                              220
        </xsd:element>
    </xsd:schema>
```

```
<xs:schema
    mins:xs="http://www.w3.org/2001/XMLS" xmins:xdb="http://xmins.oracle.com/xdb"
    version="1.0" xdb: storeVarrayAsTable="true">
<xs:element name="PurchaseOrder" type="PurchaseOrderType"
            xdb:defaultTable="PURCHASEORDER"/>
  <xs:complexType name=" PurchaseOrderType" xdb:SQLType="PURCHASEORDER">
     <xs:sequence>
       <xs:element name="Reference" type="ReferenceType" minOccurs="1"
            xdb:SQLName="REFERENCE"/>
       <xs:element name="Actions" type="ActionsType" xdb:SQLName="ACTIONS"/>
       <xs:element name="Reject" type="RejectionType" minOccurs="0"
            xdb:SQLName="REJECTION"/>
       <xs:element name="Requestor" type="RequestorType" xdb:SQLName="REQUESTOR"/>
       <xs:element name="User" type="UserType" minOccurs="1" xdb:SQLName="USERID"/>
       <xs:element name="CostCenter" type="CostCenterType"
            xdb:SQLName="COST_CENTER"/>
       <xs:element name="ShippingInstructions" type="ShippingInstructionsType"
            xdb:SQLName="SHIPPING INSTRUCTIONS"/>
       <xs:element name="SpecialInstructions" type=" SpecialInstructionsType "
            xdb:SQLName="SPECIAL INSTRUCTIONS"/>
       <xs:element name="LineItems" type="LineItemsType" xdb:SQLName="LINEITEMS"/>
     </xs:sequence>
  </xs:complexType>
  <xs:complexType name="LineItemsType" xdb:SQLType="LINEITEMS_T">
     <xs:sequence>
       <xs:element name="LineItem" type="LineItemType" maxOccurs="unbounded"
            xdb:SQLName="LINEITEM" xdb: SQLType="LINEITEM"/>
     </xs:sequence>
  </xs:complexType>
  <xs:complexType name="LineItemType" xdb:SQLType="LINEITEM_T">
     <xs:sequence>
       <xs:element name="Description" type="DescriptionType" xdb:SQLName="DESCRIPTION"/>
       <xs:element name="Part" type="PartType" xdb:SQLName="PART"/>
     </xs:sequence>
     <xs:attribute name="ItemNumber" type="xs:integer" xdb:SQLName="ITEMNUMBER"
            xdb:SQLType="NUMBER"/>
  </xs:complexType>
  <xs:complexType name="PartType" xdb:SQLType="PART_T">
     <xs:attribute name="Id" xdb:SQLName="PART_NUMBER" xdb:SQLType="VARCHAR2">
       <xs:simpleType>
         <xs:restriction base="xs:string">
           <xs:minLength value="10"/> <xs:maxLength value="14"/>
         </xs:restriction>
       </xs:simpleType>
     </xs:attribute>
     <xs:attribute name="Quantity" type="moneyType" xdb:SQLName="QUANTITY"/>
     <xs:attribute name="UnitPrice" type="quantityType" xdb:SQLName="UNITPRICE"/>
  </xs:complexType>
  <xs:simpleType name="ReferenceType">
```

```
      <xs:restriction base="xs:string">
        <xs:minLength value="18"/>
        <xs:maxLength value="30"/>
      </xs:restriction>
    </xs:simpleType>
    <xs:complexType name="ActionsType" xdb:SQLType="ACTIONS_T">
      <xs:sequence>
        <xs:element name="Action" maxOccurs="4" xdb:SQLName="ACTIO N"
              xdb:SQLCollType="ACTION_V">
          <xs:complexType xdb:SQLType="ACTION_T">
            <xs:sequence>
              <xs:element name="User" type="UserType" xdb:SQLName="ACTIONE D_BY"/>
              <xs:element name="Date" type="DateType" minOccurs="0"
                    xdb:SQLName="DATE ACTIONED"/>
            </xs:sequence>
          </xs:complexType>
        </xs:element>
      </xs:sequence>
    </xs:complexType>
    <xs:complexType name="RejectionType" xdb:SQLType="REJECTION">
      <xs:all>
        <xs:element name="User" type="UserType" minOccurs=" 0"
              xdb:SQLName="REJECTED_BY"/>
        <xs:element name="Date" type="DateTyp e" minOccurs="0"
              xdb:SQLName="DATE_REJECTED"/>                              310
        <xs:element name="Comments" type="CommentsType" minOccurs="0"
              xdb:SQLName="REASON REJECTED"/>
      </xs:all>
    </xs:complexType>
    <xs:complexType name="Shipping InstructionsType"
          xdb:SQLType="SHIPPING_INSTRUCTIONS">
      <xs:sequence>
        <xs:element name="name" type="NameType" minOccurs="0"
              xdb:SQLName="SHIP_TO_NAME"/>
        <xs:element name="address" type="AddressType" minOccurs=" 0"
              xdb:SQLName="SHIP_TO_ADDRESS"/>
        <xs:element name="telephone" type="TelephoneType" minOccurs="0"
              xdb:SQLName="SHIP_TO_PHONE"/>
      </xs:sequence>
    </xs:complexType>                                                    330
    <xs:simpleType name="moneyType">
      <xs:restriction base="xs:decimal">
        <xs:fractionDigits value="2"/>
        <xs:totalDigits value="12"/>
      </xs:restriction>
```

</xs:simpleType>

...

```
<xs:simpleType name="NameType">
  <xs:restriction base="xs:string">
    <xs:minLength value="1"/>
    <xs:maxLength value="20"/>
  </xs:restriction>
</xs:simpleType>
<xs:simpleType name="AddressType">
  <xs:restriction base="xs:string">
    <xs:minLength value="1"/>
    <xs:maxLength value="256"/>
  </xs:restriction>
</xs:simpleType>
<xs:simpleType name="TelephoneType">
  <xs:restriction base="xs:string">
    <xs:minLength value="1"/>
    <xs:maxLength value="24"/>
  </xs:restriction>
</xs:simpleType>
<xs:simpleType name="DateType">
  <xs:restriction base="xs:date"/>
```
320

...

</xs:schema>

FIG. 3A
Continued

```
<xs:complexType name="ActionsType" xdb:SQLType="ACTIONS_T">
  <xs:sequence>
    <xs:element name="Action" maxOccurs="4" xdb:SQLName="ACTION"
          xdb:SQLCollType="ACTION_V">
      <xs:complexType xdb:SQLType="ACTION_T">
        <xs:sequence>
          <xs:element name="User" type="UserType"
              xdb:SQLName="ACTIONED_BY"/>
          <xs:element name="Date" type="xsd:String" minOccurs="0"
              xdb:SQLName="DATE ACTIONED"/>              340
        </xs:sequence>
      </xs:complexType>
    </xs:element>
  </xs:sequence>
</xs:complexType>
<xs:complexType name="RejectionType" xdb:SQLType="REJECTION">
  <xs:all>
    <xs:element name="User" type="UserType" minOccurs="0"
        xdb:SQLName="REJECTED_BY"/>
    <xs:element name="Date" type="xsd:String" minOccurs="0"
        xdb:SQLName="DATE REJECTED"/>                    350
    <xs:element name="Comments" type="CommentsType" minOccurs="0"
        xdb:SQLName="REASON REJECTED"/>
  </xs:all>
</xs:complexType>
```

```
<xs:complexType name="ShippingInstructionsType"
        xdb:SQLType="SHIPPING_INSTRUCTIONS" maxOccurs="unbounded" >
    <xs:element name="name" type="NameType" minOccurs="0"
        xdb:SQLName="SHIP_TO_NAME"/>
    <xs:element name="address" type="AddressType" minOccurs="0"
        xdb:SQLName="SHIP_TO_ADDRESS"/>
    <xs:element name="telephone" type="TelephoneType" minOccurs="0"
        xdb:SQLName="SHIP_TO_PHONE"/>
</xs:complexType>
```

EVOLUTION OF XML SCHEMAS INVOLVING PARTIAL DATA COPY

RELATED APPLICATION

The present application is related to U.S. patent application Ser. No. 11/540,341, entitled "IMPLEMENTATION OF BACKWARD COMPATIBLE XML SCHEMA EVOLUTION IN A RELATIONAL DATABASE SYSTEM," filed by Agrawal, et al. on Sep. 28, 2006, the entire contents of which application is hereby incorporated by reference in its entirety for all purposes as if fully and originally disclosed herein.

The present application is related to U.S. patent application Ser. No. 11/519,720, entitled "MANAGEMENT OF COMPLEX XML SCHEMAS IN A DATABASE SYSTEM," filed by Agrawal, et al. on Sep. 11, 2006, the entire contents of which application is hereby incorporated by reference in its entirety for all purposes as if fully and originally disclosed herein.

This application is related to U.S. patent application Ser. No. 10/259,278, entitled "MECHANISM FOR MAPPING XML SCHEMAS TO OBJECT-RELATIONAL DATABASE SYSTEMS", filed by Ravi Murthy et al. on Sep. 27, 2002, the entire contents of which is hereby incorporated by reference for all purposes as if fully set forth herein.

BACKGROUND

An XML schema in an XML-type database defines the structure of instance XML documents inserted into a database. Instance XML documents are XML documents inserted into the XML-type database that conform to the XML schema. In an object-relational database system, the XML schema is used to determine the in-memory layout of the instance XML documents, as well as the database structures of the database representation in which XML documents are stored in the database system.

The database structures of a database representation of an XML schema are referred to herein as "base database structures." Base database structures include, for example, table columns that each represent an element of an XML schema or object type tables whose object type attributes correspond to elements of the XML schema.

The in-memory layout of the instance XML documents is based in large part on the individual elements and attributes defined by the XML schema. However, an instance XML document does not need to be stored object-relationally on disk for it to have an XML schema-based in-memory layout. For example, an instance XML document may be stored on disk in a CLOB (Character Large Object), and yet its in-memory layout is still determined by the XML schema.

Once XML documents are stored in a database, a client application can perform queries on the database based on elements and attributes of the schema. Suppose, however, that the client application accessing the database changes. Often a change to a client application entails changes to an XML schema and its associated base database structures to maintain compatibility with the client application as changed. The procedure for making such changes to an XML schema and its associated base database structures is called schema evolution. One approach for performing schema evolution is copy-based evolution.

Copy-based evolution is a resource intensive technique that backs up all the data stored in tables associated with the evolving XML schema, deletes the old version of the XML schema (which deletes its associated base database structures), registers the new version of the XML schema (which creates new base database structures), and re-inserts the backed up data into the newly created structures. As part of re-inserting the backed up data into the new base database structures, the database system may apply a transformation on the data (e.g., in the form of an XSLT) to conform the data (e.g., XML documents) to the new version of the XML schema.

Although, copy-based evolution can update an XML schema, there are problems with its approach. For instance, copy-based evolution requires the database system to back up, transform, and restore the entire set of XML documents associated with an XML schema (e.g., both conforming and non-conforming XML documents) even though the change to the XML schema may be minimal or only affect a few documents. As a result, in large database systems, copy-based evolution may necessitate long downtimes.

In addition, there are some situations in which XML documents may be transformed during the copy-based evolution to conform the documents to the new version of the XML schema. Transforming XML documents is a time-consuming process. The reason the transformation process is time-consuming is that it involves copying each XML document in its entirety (instead of just those portions of the document that are affected by the XML schema changes) into memory before inserting new information into the document. Moreover, once the transformation is complete, the transformed document is copied as a whole back into the updated database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Mechanisms described herein perform XML schema evolutions using partial data copy techniques. The mechanisms perform the partial data copy techniques by comparing the existing version of the XML schema to the new version of the XML schema to determine the differences between the two schemas. The differences between the existing version of the XML schema and the old version of the schema are then used to determine a minimal set of data in a database that needs to be backed up before a schema evolution operation can take place. In an embodiment, mechanisms ensure that the minimal set of data is backed up to a temporary location. Once the minimal set of data has been backed up, additional mechanisms modify the base database structures in the database to conform to the new version of the XML schema. Then, according to an embodiment, the set of minimal data is moved back into the modified base database structures. According to an embodiment, the set of minimal data is transformed before it is moved back.

Partial Data Copy

Partial data copy schema evolution combines the benefits of both in-place evolution as well as copy based evolution. In-place evolution is described in "IMPLEMENTATION OF BACKWARD COMPATIBLE XML SCHEMA EVOLUTION IN A RELATIONAL DATABASE SYSTEM," referenced above.

Using partial data copy techniques, users can perform a much more complex and varied set of schema evolution operations, without incurring the overhead of copy-based evolution techniques. Moreover, the partial data copy evolution does not have the same backward compatibility requirement as in-place evolution techniques. Note that a change to an XML schema is backward compatible if existing instance XML documents, without transformation, continue to conform to the new version of the XML schema. A database system implementing the partial data copy techniques and mechanisms described herein can execute the more complex and a varied schema evolution operations in a more reasonable execution time.

Procedure for Performing Partial Data Copy Evolution

Figure 1:
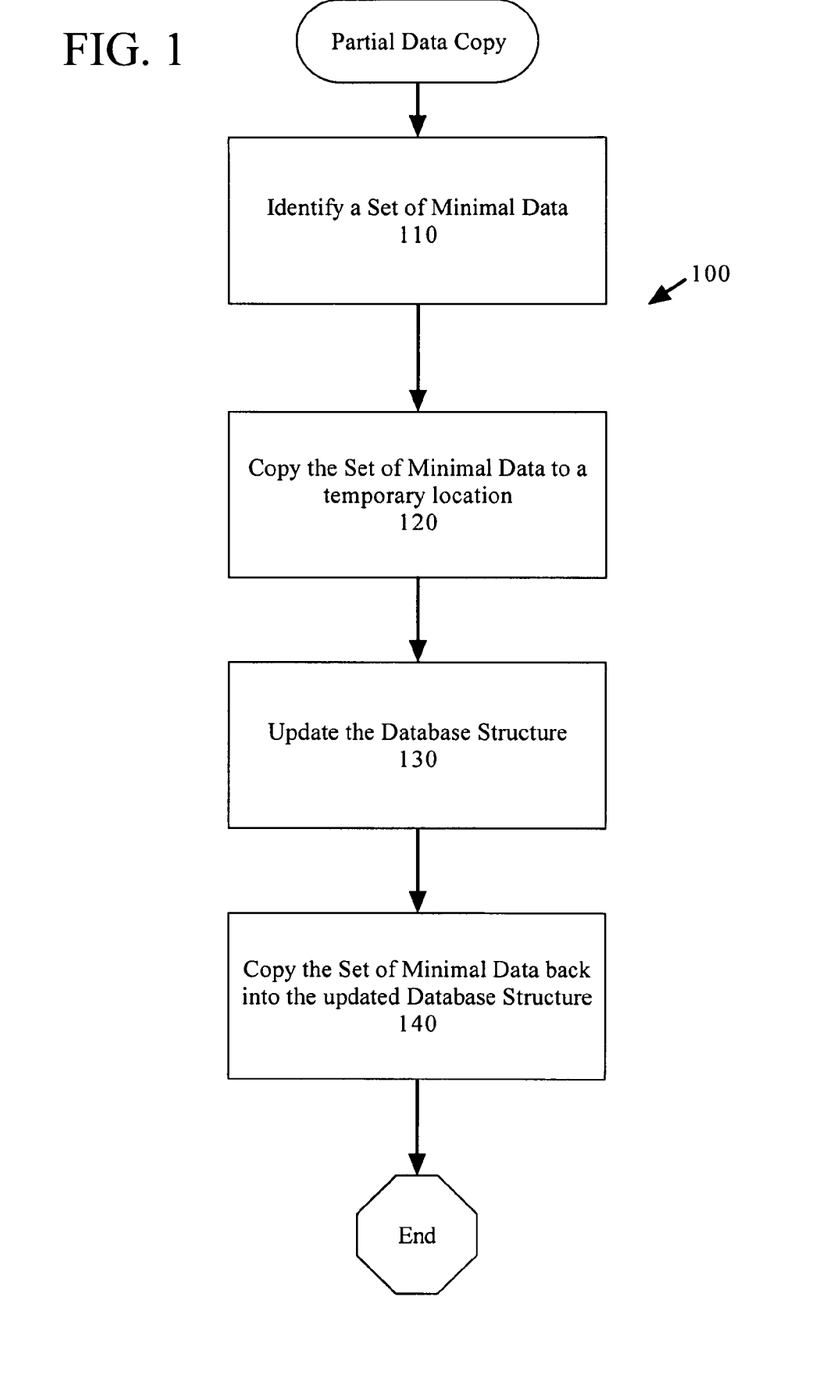
FIG. 1 is a flowchart illustrating steps to perform a partial data copy schema evolution operation, according to an embodiment of the invention.

FIG. 1 is a flowchart illustrating the procedure 100 for performing partial data copy schema evolutions. The process begins when a user invokes a schema evolution operation on a database system. The schema evolution operation may modify an XML schema in a variety of ways, for example, adding elements, removing elements, or modifying existing elements in an XML schema.

According to an embodiment, when the database system determines that a schema evolution operation has been invoked, the database system performs the following steps: 1) the database system determines if there is a minimal set of data in the database that will be affected by the schema evolution operation 110, 2) the database system copies the minimal set of data out of the database system into a temporary location 120, 3) the database system modifies the base database structures based on the requested schema evolution operation 130, and 4) the database system moves the minimal set of data back into the modified base database structures 140. In some embodiments, the minimal set of data is transformed before it is moved back to the base database structures.

Figure 2A:
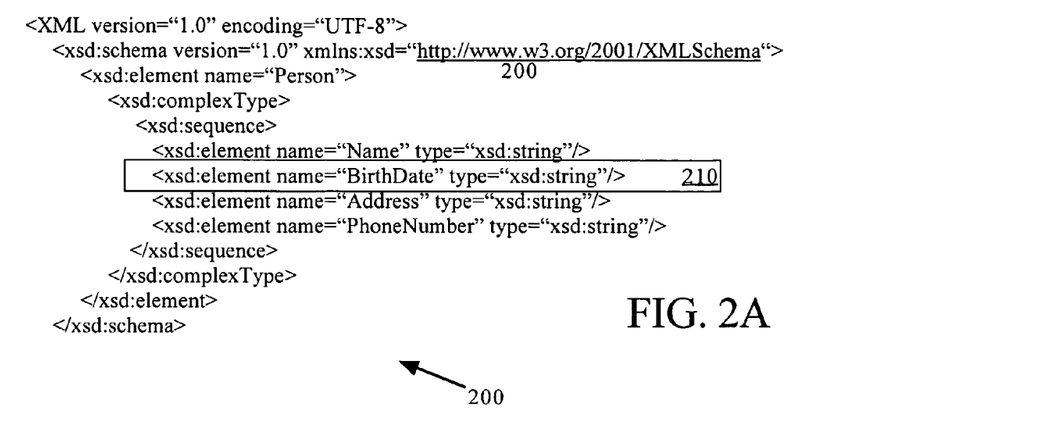
FIG. 2A is an example of XML code defining an XML schema.

For example, suppose a user creates an XML schema that defines a Person and registers the schema with a database system. FIG. 2A illustrates an example XML schema 200 defining a Person. In FIG. 2A, the Person XML schema 200 includes the elements Name, BirthDate, Address, and PhoneNumber. When the Person schema 200 is registered with a database system, the database system creates an object-relational table based on the Person schema. The resulting object-relational table has columns for each of Name, BirthDate, Address, and PhoneNumber. Moreover, each column has an associated type. In this example, BirthDate 210 initially holds simple string values. Now, assume that a number of instance XML documents are inserted into the table associated with Person.

Figure 2B:
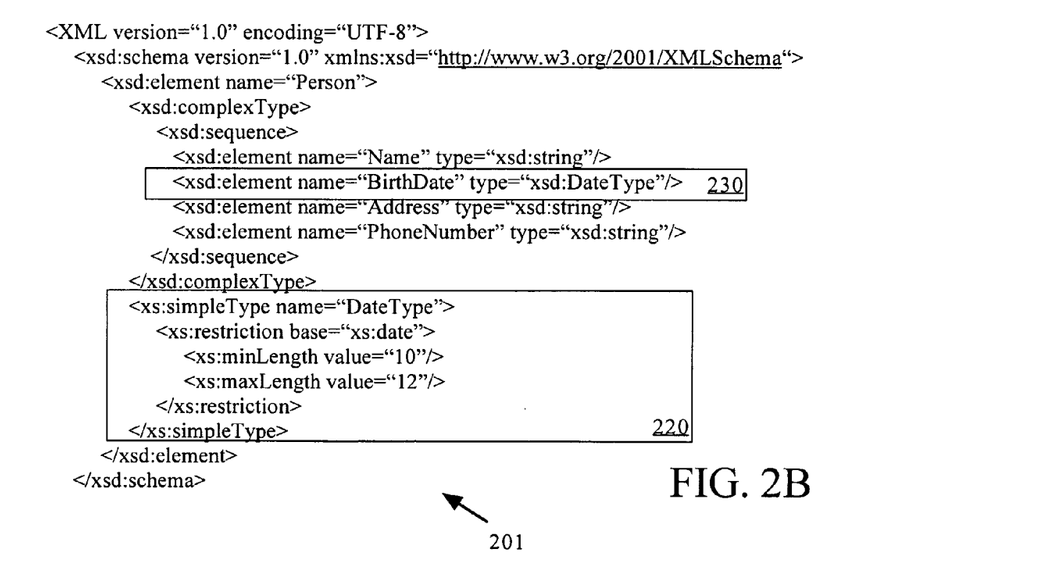
FIG. 2B is an example of XML code defining an updated XML schema.

After the instance XML documents have been inserted into the corresponding table, a database administrator updates the schema by creating a DateType that enforces a single date format. Accordingly, as illustrated in FIG. 2B, the Person schema 200 is updated to add the DateType 220 and to change BirthDate 230 from being of a string type to DateType. These changes call for schema evolution operations. Therefore, in an embodiment, the BirthDates stored in the current BirthDate column of the Person table are backed up to a temporary location. Then, the old BirthDate column is deleted from the table and a new BirthDate column of DateType is added. In some embodiments, the BirthDate column may simply be re-typed (e.g., changed from string type to DateType) without deleting the original column. In such cases, the amount of data backed up can be further limited to values in BirthDates that do not conform to DateType. Once the new BirthDate column has been created, the backed-up BirthDate information is transformed to the proper format and copied back into the new BirthDate column. In this way, a minimal amount of data (e.g., the BirthDate information) needs to be copied out.

Note that if the database system cannot transform some of the BirthDates, in an embodiment, the user is prompted to correct the problem.

Determine the Minimal Set of Data

At step 110 in FIG. 1, a database administrator performs a request to update a schema. Accordingly, the database system checks to see if the requested schema evolution operation is valid and then determines if there is a minimal set of data that is affected by the schema evolution request. The minimal set of data generally refers to an amount of data that has been determined to be the least amount needed to be backed up in order for a schema evolution operation to take place. To determine the minimal set of data, in one implementation, the database system compares the existing version of an XML schema to a new version of the XML schema in order to identify differences between the two. Comparing the two schemas can be performed using a lock-step traversal of both schemas. In alternative embodiments, the comparison is performed in some other way.

For example, suppose after performing a lock-step traversal of both schemas, the database system determines that the only difference between the two schemas is a single element corresponding to a column in the object-relational database. In such a case, that column comprises a minimal set of data to be backed up. Alternatively, if multiple columns are affected by the schema evolution operation, then multiple columns are marked to be backed up.

In an embodiment, additional filtering criteria may be used to identify single entries within a column or table that are affected by the schema evolution operation. For instance, in the BirthDate example above, suppose the vast majority of the BirthDates in the old BirthDate column are already in DateType format. Accordingly, in an embodiment, the minimal set of data may include only those BirthDate entries that do not conform to DateType. In such a case, instead of deleting the entire column, the database system may simply back up those entries that do not conform to the proper format and create a second BirthDate column for those entries.

In the end, the process of determining the data affected by a schema evolution operation involves identifying which elements in the schema are going to be updated by the schema evolution operations. In an embodiment, the database system evaluates the proposed changes to the schema to determine which elements' corresponding column (or entries) in the database structure will be changed by the schema evolution operation. Those elements' columns or entries are marked as data to be backed up.

Copy Out the Minimal Set of Data

After the database system has marked the minimal set of data that needs to be backed up, at step 120, the database system performs a copy operation. The copy operation moves the identified minimal set of data to a temporary location until the underlying database structure can be modified. For example, the minimal set of data is copied to a temporary table or column until the schema evolution operations have completed. Note that the temporary location or table may be part of the same database system in which the XML schema is registered. In an embodiment, the temporary location may even be in the same database represesentation.

Since most schema evolution operations affect only a small portion of a schema at a time, the minimal set of data is often relatively small. Thus, by backing up the minimal set of data, the running time for the schema evolution operation in many cases is drastically reduced. This in turn drastically reduces database downtime.

In an embodiment, the ability to back-up minimal sets of data allows a database administrator to update a schema incrementally. This means that although an XML schema may need to be changed drastically, the database administrator can perform partial data copy schema evolution on just a few elements at a time. In this way, the schema evolution process can be rolled out over time.

In an embodiment, the partial data-copy techniques allow schema evolution operations to be performed while the database is live.

Modify the Database Structure

At step 130, after the minimal set of data has been copied to a temporary location, in an embodiment, the database system performs the schema evolution operations to modify the base database structure that stores the instance XML documents. This step involves modifying the base database structures that store the instance XML documents to be consistent with the new version of the XML schema. The process of modifying the database structure typically involves invoking data definition language ("DDL") or other low-level database commands to add, remove, and modify columns, tables, or other database structures from the base database structures.

For example, in the BirthDate example above, the schema evolution operations may invoke an "alter table" command once the minimal set of data has been copied to a temporary location. The "alter table" command instructs the database system to make changes to the underlying Person table. Accordingly, in an embodiment, the BirthDate column is deleted by an alter table command and a new BirthDate column added to the Person table.

Copy the Data Back into the Modified Database Structure

At step 140, after all the changes have been made to the database structure associated with the instance XML documents, the database system copies the data from its temporary location into the modified structures.

Skipping the Copy Operation

According to an embodiment, steps 120 and 140 of procedure 100 can be combined to further reduce the amount of data being copied from location to another. For example, in the BirthDate example above, in an alternative implementation, instead of backing the minimal set of data to a temporary location, the database system creates a new BirthDate column in the table and copies the set of minimal data directly to the new column. In this way, the contents of the BirthDate column can be copied directly into a new BirthDate column while the old column is still active.

In an embodiment, the minimal set of data can also be transformed to conform to the DateType before being copied to the new BirthDate column. This allows the entire partial data copy evolution process to occur while the database is still up. Once the copying to the new BirthDate column has completed, the database system simply renames the columns.

In another embodiment, the XML schema evolution creates an entirely new BirthDate column called BirthDate2. In this embodiment, the database system can then not only copy the minimal set of data directly to the new column, but since the updated schema introduces a new column with a new name, the last rename step can also be avoided.

In yet other embodiments, the steps may be performed in a different order, other steps may be combined, some steps may be separated, or some steps may be skipped.

Example Operation of Partial Data Copy

Figure 3A:
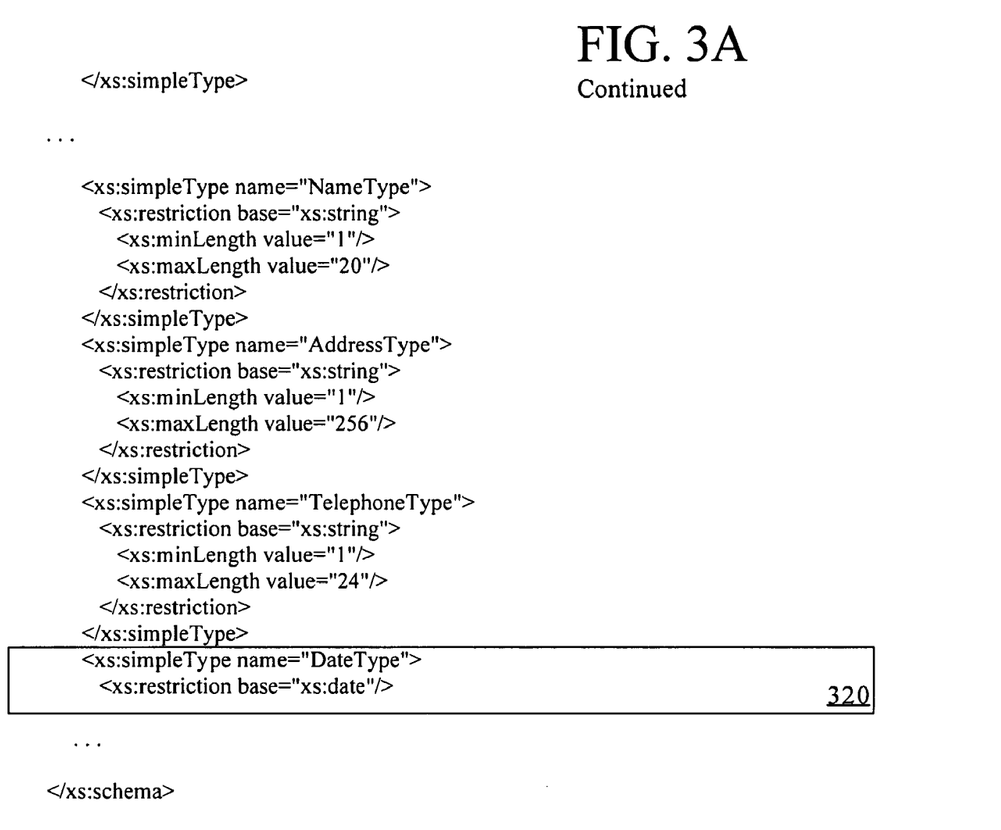
FIG. 3A is an example of XML code defining a new XML schema.

To further illustrate procedure 100, consider the following examples that are based on XML schema 300 illustrated in FIG. 3A. XML schema 300 is a new version of an XML schema that defines a PurchaseOrder table with a number of different element types (e.g., elements such as a user of type "user type", a reference of type "reference type", item number as type integer, etc.).

Figure 3B:
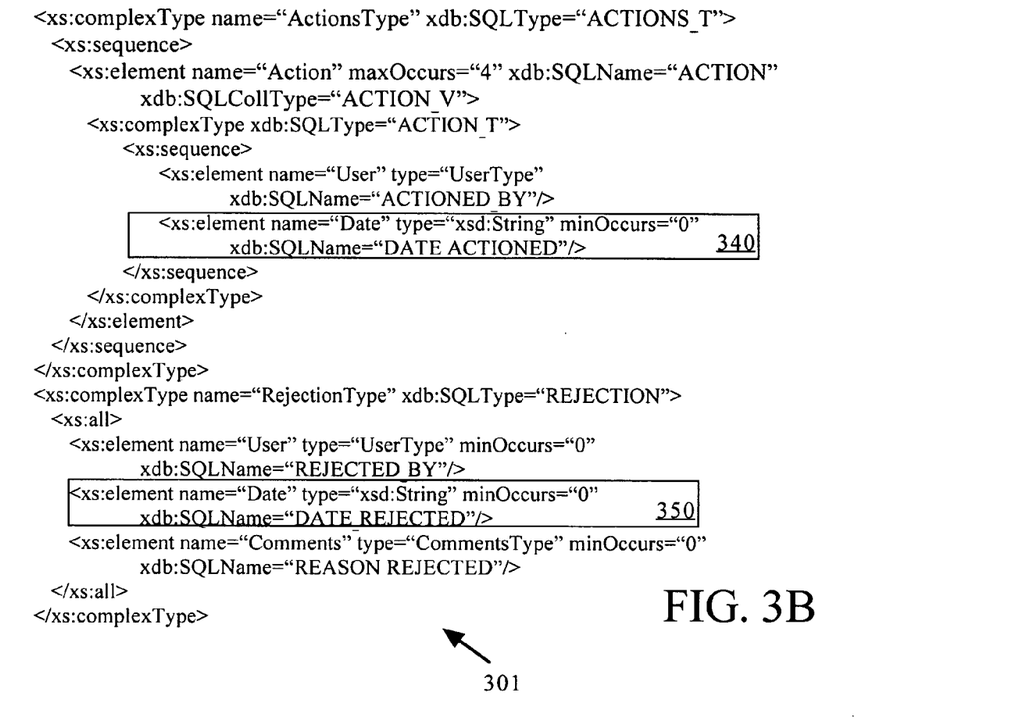
FIG. 3B is an example of XML code defining a segment of an old XML schema.

Suppose in old version of the XML schema, the Date element is defined as a string, and as a result errors, inconsistencies, and invalid date information are introduced to the database. FIG. 3B illustrates a segment 301 of the old version of XML schema 300 with Date element 340 defined as a string. Because in the old version of the schema the Date element is defined as a string, the administrator for the database decides to change the type of the Date 310 from string to DateType 320. Accordingly, the database administrator inputs commands to evolve the old version of the XML schema to the new version 300 illustrated in FIG. 3A. As a result, the database system executes the following steps to evolve the Date element from a string type to DateType 320.

As discussed in connection with procedure 100 illustrated in FIG. 1, the database system compares the old version of the XML schema to the new version of the XML schema 300 to identify changes between the two schemas. In this example, the only changes are those made in connection with the Date element 310 and DateType 320. Accordingly, the database system copies out the set of data corresponding to Date from the PurchaseOrder table. In an embodiment, the information in the Date column is copied out to a temporary location using DDL commands. An example of a DDL command to copy the information stored in the Date column to a temporary location is illustrated below at Instruction 1:

---
Instruction 1
---
create table BACKUP_DATES as (select extractvalue(value(p), '/PurchaseOrder/Reject/Date/text()') date, ref(p) reference from PURCHASEORDER p)
---

Instruction 1 creates a table called Backup_Dates where all of the data stored in the PurchaseOrder table's Date column is copied. Then, the database system removes the old Date element from the old version of the XML schema by performing in-place evolution. In addition, the PurchaseOrder table is modified by the database system to remove the old Date column. In an embodiment, a command such as an "alter table" command can be used to remove the old Date column.

After the old Date element has been removed from the old version of the XML schema and the corresponding column removed from the Purchase Order table, the database system updates the schema by adding a new Date element 310 to the new version of the XML schema. The new Date element 310 is of type DateType 320. In conjunction with this update, a new column is added to the PurchaseOrder table corresponding to the new Date element. The new column is also of type DateType.

After the new Date column has been added to the PurchaseOrder table, then the data stored in the Backup_Dates table is copied back into the new Date column. Instruction 2 below illustrates an example DDL command for copying the Date data back into the PurchaseOrder table.

---
Instruction 2
---
update PURCHASEORDER p set
value(p)=(select insertChildXML(value(p),
  '/PurchaseOrder/Reject', 'Date', b.date) from BACKUP_DATES b
  where b.reference=ref(p)
---

It should be noted that, in this example, the partial data copy schema evolution affects one column in a large table. Accordingly, the execution time is relatively short compared to a full data copy operation.

In an embodiment, the new Date column of type DateType is added prior to the initial backing-up of the Date data. In this embodiment, the data in the original Date column is transformed and copied directly to the new Date column. Moreover, in this embodiment, the partial data copy schema evolution operations are performed while the PurchaseOrder table is active.

Figure 3C:
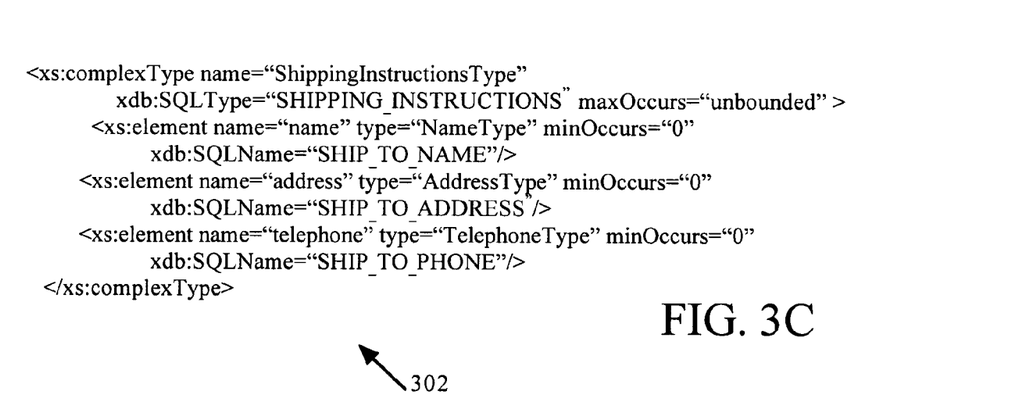
FIG. 3C is an example of XML code defining a segment of an old XML schema.

Consider another example of a partial data copy schema evolution. In this example, a scalar element is converted into a non-scalar element. This example is slightly more complex but has similar implications for the XML schema and its associated database structure. Referring again to the new version of XML schema 300 shown in FIG. 3A, suppose a database administrator wishes to change the sequence element listed under the complexType "ShippingInstructions Type" 330 from its current scalar value (e.g., only one shipping instruction can be listed) to an unbounded value (e.g., to store multiple instructions) as illustrated in FIG. 3C. The reason this example is a little bit more complex is that the partial data copy evolution schema operations are converting information that was stored as scalars to arrays (or collections) of information. Accordingly, the following steps outline what the database system does to accomplish a partial data copy schema evolution in this example.

Again, the database system begins by copying out all the data corresponding to the ShippingInstructions column. Instruction 3 below illustrates an example DDL command for creating the backup table for ShippingInstructions and copying the data associated with ShippingInstructions to the backup table.

---
Instruction 3
---
create table BACKUP_SHIP_INST as (select extract(value(p), '/PurchaseOrder/ShippingInstructions' shipinst, ref(p) reference) from PURCHASEORDER p)
---

Once the backup table has been created and all the ShippingInstruction information copied to it, the database system removes the ShippingInstructions element and the global ShippingInstructions type from XML schema 300 through in-place evolution operations. The reason for deleting both the ShippingInstructions element and the ShippingInstructions type is because ShippingInstructions type in FIG. 3A is designed to store just one ShippingInstruction, not a collection of ShippingInstructions.

Once the ShippingInstructions element and the ShippingInstructions type have been removed, the database system creates a new global ShippingInstructions type with a new definition that can store collections of ShippingInstructions. Moreover, a new ShippingInstructions element is added to PurchaseOrderType with the desired ShippingInstructions type definition. As before, corresponding changes are made in the associated base database structures through in-place evolution commands.

Once a new ShippingInstruction column has been added to PurchaseOrder table, the data stored in backup is copied to the new ShippingInstructions column. Instruction 4 below illustrates an example command for copying the data back into the PurchaseOrder table.

---
Instruction 4
---
update PURCHASEORDER p set
value(p)=(select insertChildXML(value(p),
  '/PurchaseOrder', 'ShippingInstructions') from
  BACKUP_SHIP_INST b where b.reference=ref(p))
---

By performing partial copy data evolution users have the benefits of both in-place and copy-based evolution. As a result, the schema evolution process runs more efficiently, reducing downtime and providing a wider variety of options on how to update XML schemas.

Hardware Overview

Figure 4:
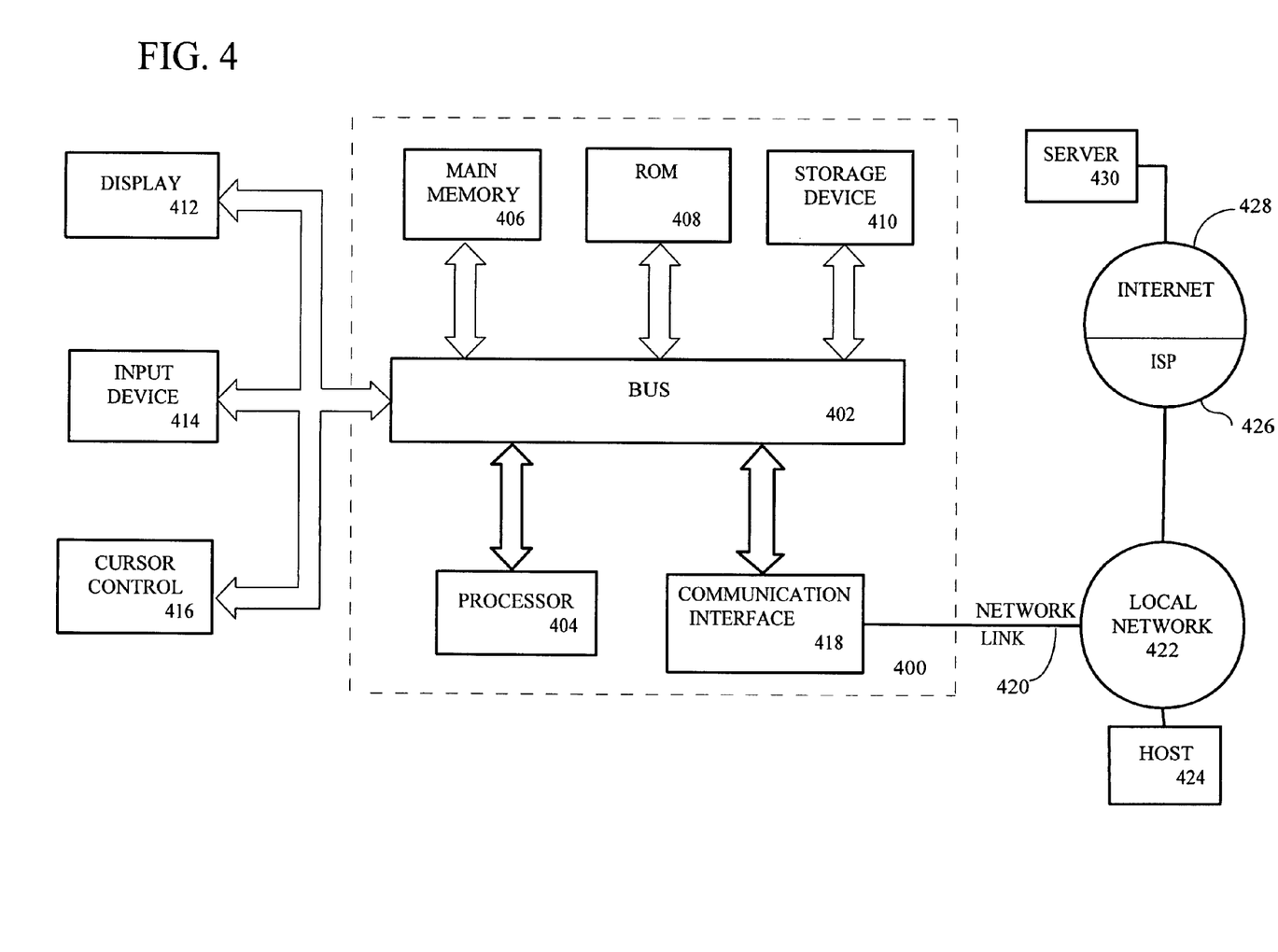
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one implementation of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. In a database system, a method for performing a schema evolution operation using partial data copy, the method comprising:
to convert one or more XML documents that conform to a first version of an XML schema to a second version of the XML schema that is different from the first version, determining an affected portion of data in each of the one or more XML documents that is affected by converting said one or more XML documents from the first version of the XML schema to the second version of the XML schema;
wherein a first object-relational database representation is used to store the XML documents conforming to said first version of the XML schema;
determining one or more first object-relational database structures within said first object-relational database representation that are used to store at least said affected portion of said data;
based on the one or more first object-relational database structures, determining one or more second object-relational database structures in a second database representation used to store XML documents conforming to said second version of the XML schema;
wherein the first object-relational database representation is different from the second object-relational database representation;
wherein determining the one or more second object-relational database structures includes determining to remove or modify at least one particular first object-relational database structure of said one or more first-object relational database structures;
populating at least one particular second object-relational database structure of the one or more second object-relational database structures based on said affected portion of data in the one or more XML documents that conform to the first version of the XML schema; and
wherein the method is performed by one or more computing devices.

2. The method of claim 1, further comprising transforming at least a portion of said affected portion of data to conform to the second version of the XML schema.

3. The method of claim 1, wherein one of the first object-relational database representation and the second object-relational database representation include at least one database structure not in the other.

4. The method of claim 1, wherein determining the affected portion of data in each of the one or more XML documents includes:
comparing the first version of the XML schema to the second version of the XML schema; and
determining one or more differences between the first version of the XML schema and the second version of the XML schema.

5. The method of claim 1, further comprising:
prior to populating at least one particular second object-relational database structure of the one or more second object-relational database structures, copying out the affected portion of data to a temporary storage location.

6. The method of claim 5, further comprising transforming at least a portion of the affected portion of data to the second version of the XML schema prior to populating at least one particular second object-relational database structure of the one or more second object-relational database structures based on said affected portion of data and wherein the at least one second particular object-relational database structure is populated with result of said transformation.

7. The method of claim 1, wherein the first object-relational database representation is a first object-relational table and the second object-relational database representation is a second object-relational table and the one or more first object-relational database structures are one or more first columns and the one or more second object-relational database structures are one or more second columns.

8. The method of claim 7, wherein either the first object-relational table or the second object-relational table includes a column not in the other object-relational table.

9. The method of claim 1, wherein the second version of the XML schema is a version of the XML schema derived by performing at least one of adding, deleting, and modifying an element in the first version of the XML schema.

10. A non-transitory computer-readable volatile or non-volatile storage medium storing one or more sequences of instructions which, when executed by one or more processors, causes the one or more processors to perform the steps of:
to convert one or more XML documents that conform to a first version of an XML schema to a second version of the XML schema that is different from the first version, determining a an affected portion of data in each of the one or more XML documents that is affected by converting said one or more XML documents from the first version of the XML schema to the second version of the XML schema;
wherein a first object-relational database representation is used to store the XML documents conforming to said first version of the XML schema;
determining one or more first object-relational database structures within said first object-relational database representation that are used to store at least said affected portion of said data;
based on the one or more first object-relational database structures and the affected portion of data, determining one or more second object-relational database structures in a second database representation used to store XML documents conforming to said second version of the XML schema;
wherein the first object-relational database representation is different from the second object-relational database representation; and
wherein determining the one or more second object-relational database structures includes determining to remove or modify at least one particular first object-relational database structure of said one or more first-object relational database structures;
populating at least one particular of the one or more second object-relational database structures based on said affected portion of data in the one or more XML documents that conform to the first version of the XML schema.

11. The non-transitory computer-readable volatile or non-volatile storage medium of claim 10, further comprising instructions to perform the step of transforming at least a portion of said affected portion of data to conform to the second version of the XML schema.

12. The non-transitory computer-readable volatile or non-volatile storage medium of claim 10, wherein one of the first object-relational database representation and the second object-relational database representation include at least one database structure not in the other.

13. The non-transitory computer-readable volatile or non-volatile storage medium of claim 10, wherein the instructions for determining the affected portion of data in each of the one or more XML documents comprise instructions for performing the steps of:
  comparing the first version of the XML schema to the second version of the XML schema; and
  determining one or more differences between the first version of the XML schema and the second version of the XML schema.

14. The non-transitory computer-readable volatile or non-volatile storage medium of claim 10, further comprising instructions for performing the steps of:
  prior to populating at least one particular second object-relational database structure of the one or more second object-relational database structures, copying out the affected portion of data to a temporary storage location.

15. The non-transitory computer-readable volatile or non-volatile storage medium of claim 14, further comprising instructions for performing the step of transforming at least a portion of the affected portion of data to conform to the second version of the XML schema prior to populating at least one particular second object-relational database structure of the one or more second object-relational database structures based on said affected portion of data and wherein the at least one particular second object-relational database structure is populated with a result of said transformation.

16. The non-transitory computer-readable volatile or non-volatile storage medium of claim 10, wherein the first object-relational database representation is a first object-relational table and the second object-relational database representation is a second object-relational table and the one or more first object-relational database structures are one or more first columns and the one or more second object-relational database structures are one or more second columns.

17. The non-transitory computer-readable volatile or non-volatile storage medium of claim 16, wherein either the first object-relational table or-the second object-relational table includes a column not in the other object relational table.

18. The non-transitory computer-readable volatile or non-volatile storage medium of claim 10, wherein the second version of the XML schema is a version of the XML schema derived by performing at least one of adding, deleting, and modifying an element in the first version of the XML schema.

19. The method of claim 1, further including modifying one or more base database structures based on a requested schema evolution operation.

20. The non-transitory computer-readable volatile or non-volatile storage medium of claim 10, further including instructions for modifying one or more base database structures based on a requested schema evolution operation.

* * * * *

UNITED STATES PATENT AND TRADEMARK OFFICE
CERTIFICATE OF CORRECTION

PATENT NO. : 8,346,725 B2  
APPLICATION NO. : 11/521907  
DATED : January 1, 2013  
INVENTOR(S) : Baby et al.

Page 1 of 1

It is certified that error appears in the above-identified patent and that said Letters Patent is hereby corrected as shown below:

In the Specification

In column 5, line 31, delete "represesentation." and insert -- representation. --, therefor.

In the Claims

In column 11, line 34-35, in Claim 1, delete "first-object relational" and insert -- first object-relational --, therefor.

In column 12, line 12, in Claim 8, delete "or-the" and insert -- or the --, therefor.

In column 12, line 27, in Claim 10, delete "a an" and insert -- an --, therefor.

In column 12, line 47, in Claim 10, delete "representation; and" and insert -- representation; --, therefor.

In column 12, line 53, in Claim 10, delete "particular" and insert -- particular second object-relational database structure --, therefor.

In column 14, line 11, in Claim 17, delete "or-the" and insert -- or the --, therefor.

In column 14, line 12, in Claim 17, delete "object relational" and insert -- object-relational --, therefor.

Signed and Sealed this  
Sixteenth Day of April, 2013

Teresa Stanek Rea  
*Acting Director of the United States Patent and Trademark Office*